US007475605B2

(12) United States Patent
Shiao

(10) Patent No.: US 7,475,605 B2
(45) Date of Patent: Jan. 13, 2009

(54) ELECTRONIC TORQUE WRENCH

(76) Inventor: Hsuan-Sen Shiao, No. 55, Cheng-Feng Lane, Tai-Ming Rd., Wu-Jih Hsiang, Taichung Hsien (TW)

( * ) Notice: Subject to any disclaimer, the term of this patent is extended or adjusted under 35 U.S.C. 154(b) by 165 days.

(21) Appl. No.: 11/649,318

(22) Filed: Jan. 3, 2007

(65) Prior Publication Data

US 2008/0156111 A1 Jul. 3, 2008

(51) Int. Cl.
*G01L 5/24* (2006.01)

(52) U.S. Cl. ................................ 73/862.21; 73/862.23

(58) Field of Classification Search ............. 73/862.21, 73/862.23

See application file for complete search history.

(56) References Cited

U.S. PATENT DOCUMENTS

| | | | | | |
|---|---|---|---|---|---|
| 3,580,057 | A * | 5/1971 | Seegmiller | ................... | 73/597 |
| 5,847,316 | A * | 12/1998 | Takada | ....................... | 174/374 |
| 5,848,655 | A * | 12/1998 | Cooper et al. | ............... | 173/176 |
| 6,257,907 | B1 * | 7/2001 | Feichtinger | ................. | 439/135 |
| 6,928,885 | B1 * | 8/2005 | Shiao et al. | .............. | 73/862.21 |
| 6,948,380 | B1 * | 9/2005 | Shiao et al. | .............. | 73/862.21 |
| 7,119,705 | B2 * | 10/2006 | Manlove et al. | ............. | 340/667 |
| 7,313,990 | B1 * | 1/2008 | Shiao | .......................... | 81/479 |
| 2008/0134845 | A1 * | 6/2008 | Shiao | .......................... | 81/479 |

* cited by examiner

*Primary Examiner*—Harshad Patel
*Assistant Examiner*—Freddie Kirkland, III
(74) *Attorney, Agent, or Firm*—Brinks Hofer Gilson & Lione

(57) ABSTRACT

An electronic torque wrench includes a wrench body and a torsion meter. The wrench body includes a head portion, and a neck portion connected to the head portion. The torsion meter includes a strain sensor provided on the neck portion, and a processing unit connected electrically to the strain sensor and disposed in the wrench body. A conductive shield surrounds at least the strain sensor, and is connected electrically to the torsion meter for providing protection against electromagnetic interference.

8 Claims, 4 Drawing Sheets

ELECTRONIC TORQUE WRENCH

BACKGROUND OF THE INVENTION

1. Field of the Invention

The invention relates to a wrench, more particularly to an electronic torque wrench.

2. Description of the Related Art

U.S. Pat. Nos. 3,970,155, 4,006,629, 4,522,075, 4,669,319, and 4,976,133 disclose electronic torque wrenches that have strain gauges. The strain gauges detect elastic strains and changes in electrical resistances, translate the changes into an electrical signal, and in cooperation with a processing circuit which includes a Wheatstone bridge, an amplifier, a recorder, a microprocessor, an output unit, etc., determine a value of torque applied to a workpiece.

However, when the aforementioned electronic torque wrenches are used in a high electromagnetic interference (EMI) environment, such as in a heavily equipped factory, the accuracy of the electronic torque wrenches is adversely affected, and damage to electronic components inside the electronic torque wrenches may occur.

SUMMARY OF THE INVENTION

Therefore, the object of the present invention is to provide an electronic torque wrench which has a conductive shield to protect the electronic torque wrench against electromagnetic interference.

According to this invention, an electronic torque wrench comprises a wrench body, a torsion meter, and a conductive shield. The wrench body includes a head portion, and a neck portion connected to the head portion. The torsion meter includes a strain sensor provided on the neck portion, and a processing unit connected electrically to the strain sensor and disposed in the wrench body. The conductive shield surrounds at least the strain sensor, and is connected electrically to the torsion meter for providing protection against electromagnetic interference.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
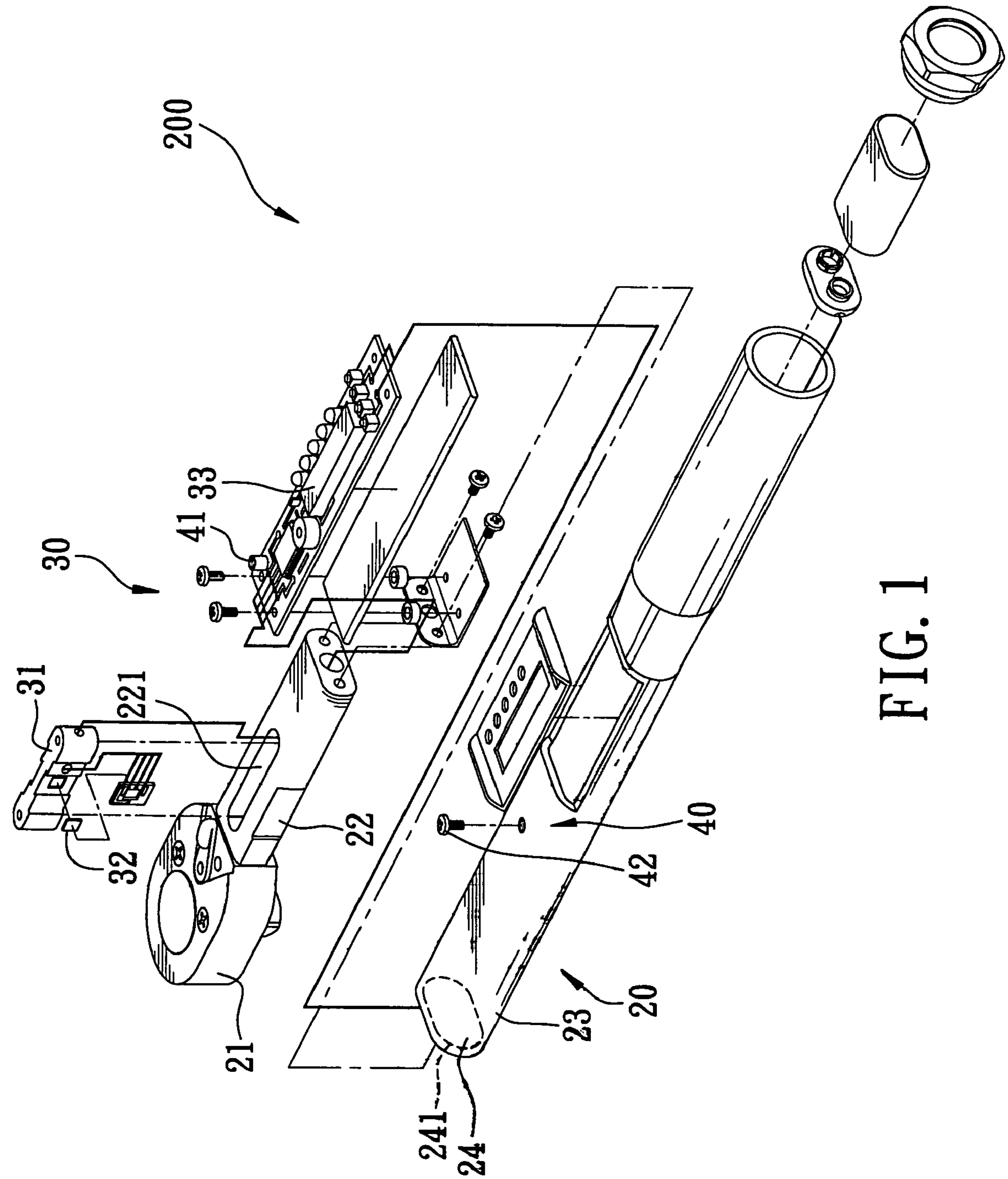
FIG. 1 is an exploded perspective view of the first preferred embodiment of an electronic torque wrench according to the present invention.

Before the present invention is described in greater detail, it should be noted that like elements are denoted by the same reference numerals throughout the disclosure.

Figure 2:
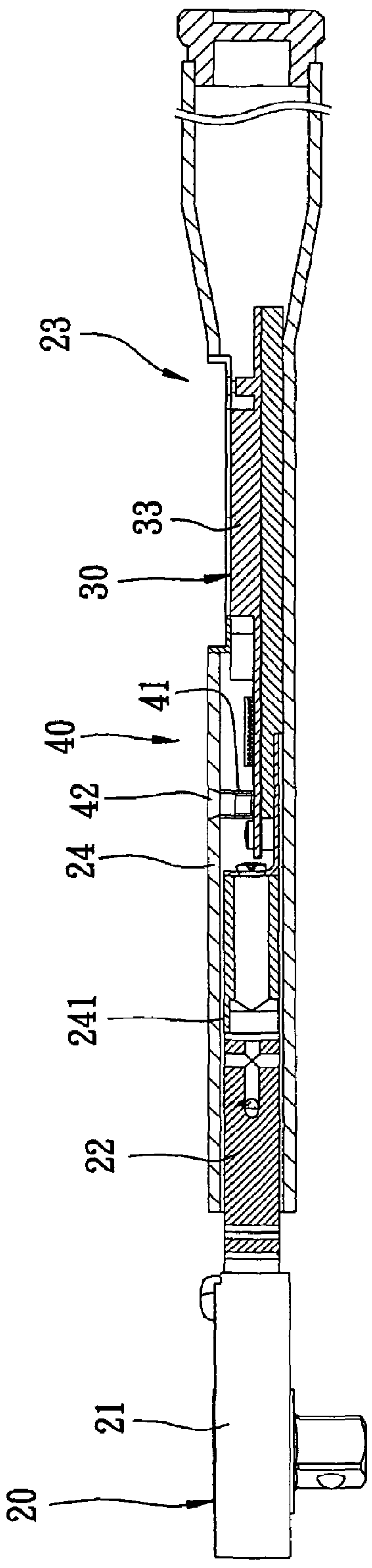
FIG. 2 is a sectional view of the first preferred embodiment in an assembled state.

Referring to FIGS. 1 and 2, the first preferred embodiment of an electronic torque wrench 200 according to the present invention is shown to comprise a wrench body 20, a conductive shield 24, a torsion meter 30, and a connecting unit 40.

The wrench body 20 is made of metal, and includes a head portion 21, a neck portion 22 connected to the head portion 21 and having a groove 221, and an elongated handle portion 23 connected to the neck portion 22. In this embodiment, the handle portion 23 is hollow, is sleeved on the neck portion 22, and surrounds the groove 221.

In this embodiment, the conductive shield 24 is a housing wall of the handle portion 23 and the neck portion 22 and defines a receiving space 241. Thus, the groove 221 is received within the receiving space 241. As an alternative, the conductive shield 24 may be a tubular sleeve or a flexible cover film that contains a conductive material.

The torsion meter 30 includes a strain body 31 disposed in the groove 221, a strain sensor 32 connected to the strain body 31, and a processing unit 33 connected electrically to the strain sensor 32. The strain sensor 32 along with the strain body 31 is disposed within the receiving space 241. The strain sensor 32 outputs a signal that varies along with a change in the torque applied to a workpiece through the head portion 21. In this embodiment, the strain sensor 32 is a chip made using micro electromechanical system (MEMS) technology, and is provided with resistors that form a Wheatstone bridge circuit. Since this is a known art, it is not detailed herein. Alternatively, the strain sensor 32 may be a large diaphragm strain gauge, which is also provided with resistors that make up a Wheatstone bridge circuit.

The processing unit 33 is disposed in the handle portion 23, and is thus located within the receiving space 241. The processing unit 33 receives and processes the signal from the strain sensor 32, and displays the amount of torque applied by the user during operation.

The connecting unit 40 includes a first connecting member 41 connected electrically to the torsion meter 30, and a second connecting member 42 connected electrically to the conductive shield 24. When the first and second connecting members 41, 42 are connected electrically to each other, the conductive shield 24 is grounded.

In this embodiment, the first connecting member 41 is configured as a female screw provided on the processing unit 33, and the second connecting member 42 is configured as a male screw extending through the conductive shield 24 and engaged threadedly to the female screw. The conductive shield 24 is connected to a grounding conductor (not shown) of the processing unit 33 through the male and female screws so that the conductive shield 24 has the same potential as the grounding conductor.

Through the shielding effect of the conductive shield 24, the strain sensor 32 and the processing unit 33 are shielded electrostatically and electromagnetically from external interference. Therefore, when a high precision strain sensor is used, for instance, when the detected signal changes by only a few millivolts (mV), due to the protection provided by the conductive shield 24, the transmitted signal can be kept stable and will not be distorted. Hence, the electronic torque wrench 200 can achieve effectively the purpose of providing protection against electromagnetic interference. Even in an environment of high electromagnetic interference, an accurate output torque measurement can be obtained.

Figure 3:
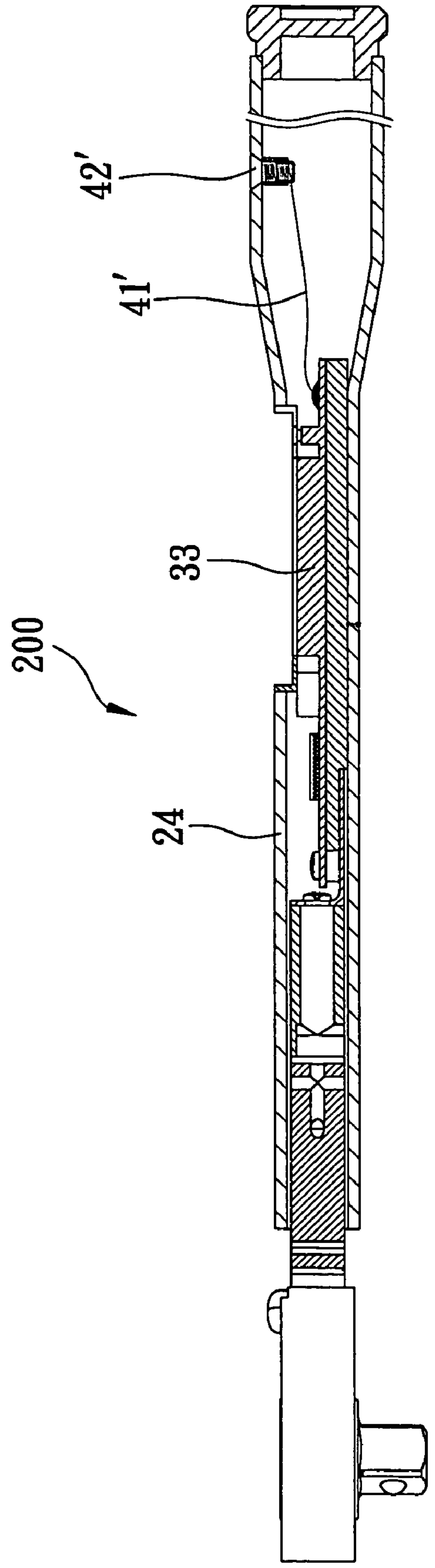
FIG. 3 is an assembled sectional view of the second preferred embodiment of an electronic torque wrench according to the present invention.

Referring to FIG. 3, the second preferred embodiment of the electronic torque wrench 200 according to the present invention is shown to be similar to the first preferred embodiment. However, in this embodiment, the first connecting member is configured as a conductive wire 41' connected electrically to the processing unit 33, and the second connecting member is configured as a screw 42' extending through the conductive shield 24. The conductive wire 41' is connected to and wound around the screw 42'. The conductive shield 24 is grounded through the conductive wire 41' and the screw 42', thereby similarly achieving the shielding effect of the conductive shield 24 described in the first preferred embodiment.

Figure 4:
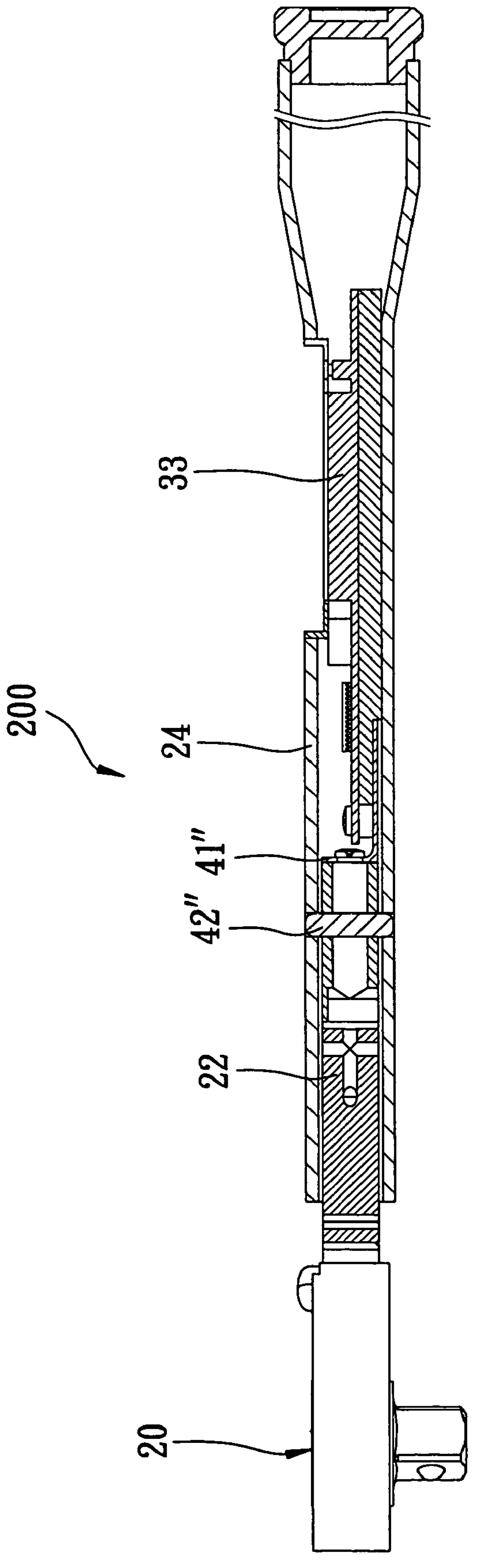
FIG. 4 is an assembled sectional view of the third preferred embodiment of an electronic torque wrench according to the present invention.

Referring to FIG. 4, the third preferred embodiment of the electronic torque wrench 200 according to the present invention is shown to be similar to the first preferred embodiment. However, in this embodiment, the neck portion 22 contains a conductive material, the first connecting member is configured as a conductive plate 41" connected electrically to the processing unit 33 and disposed between the processing unit 33 and the neck portion 22, and the second connecting member is configured as a conductive pin 42" connected electrically to and penetrating the conductive shield 24 and the neck portion 22. The conductive shield 24 is thus grounded through the conductive pin 42", the neck portion 22, and the conductive plate 41". The shielding effect of the conductive shield 24 described in the first preferred embodiment is similarly achieved.

It should be noted that the conductive shield 24 described in each of the aforementioned embodiments is grounded through a single point grounding connection. Alternatively, the conductive shield 24 may be grounded through a multipoint grounding connection which connects the conductive shield 24 electrically to the grounding conductor of the torsion meter 30 at a plurality of connection points.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electronic torque wrench comprising:

a wrench body including a head portion, and a neck portion connected to said head portion;

a torsion meter including a strain sensor provided on said neck portion, and a processing unit connected electrically to said strain sensor and disposed in said wrench body;

a conductive shield surrounding at least said strain sensor and connected electrically to said torsion meter for providing protection against electromagnetic interference; and a connecting unit that includes a first connecting member connected electrically to said torsion meter, and a second connecting member connected electrically to said conductive shield, said first and second connecting members being connected to each other to form an electrical connection.

2. The electronic torque wrench of claim 1, wherein said wrenchbody further includes a handle portion connected to said neck portion, said neck portion having a groove that receives said strain sensor.

3. The electronic torque wrench of claim 2, wherein said torsion meter further includes a strain body, said strain sensor being connected to said strain body.

4. The electronic torque wrench of claim 2, wherein said conductive shield is a housing wall of said handle portion and said neck portion.

5. The electronic torque wrench of claim 4, wherein said processing unit is disposed in said handle portion and surrounded by said housing wall.

6. The electronic torque wrench of claim 1, wherein said first connecting member is configured as a female screw fixed to said processing unit, said second connecting member being configured as a male screw extending through said conductive shield and engaging threadedly said female screw, said conductive shield being grounded through said male and female screws.

7. The electronic torque wrench of claim 1, wherein said first connecting member is configured as a conductive wire connected electrically to said processing unit, said second connecting member being configured as a screw extending through said conductive shield, said conductive wire being connected to said screw, said conductive shield being grounded through said conductive wire and said screw.

8. The electronic torque wrench of claim 1, wherein said neck portion has a conductive material, said first connecting member being configured as a conductive plate connected electrically between said processing unit and said neck portion, said second connecting member being configured as a conductive pin connected electrically to and penetrating said conductive shield and said neck portion, said conductive shield being grounded through said conductive plate, said conductive pin, and said neck portion.

* * * * *